US012677012B2

(12) United States Patent
Abdulhayoglu

(10) Patent No.: US 12,677,012 B2
(45) Date of Patent: *Jul. 7, 2026

(54) SYSTEM AND METHOD OF ALTERING REAL TIME AUDIO AND VIDEO STREAMS

(71) Applicant: Ezlo Innovation LLC, Bloomfield, NJ (US)

(72) Inventor: Melih Abdulhayoglu, Montclair, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,756

(22) Filed: May 15, 2024

(65) Prior Publication Data

US 2024/0298047 A1    Sep. 5, 2024

Related U.S. Application Data

(63) Continuation of application No. 18/081,642, filed on Dec. 14, 2022.

(60) Provisional application No. 63/290,804, filed on Dec. 17, 2021.

(51) Int. Cl.
H04N 21/234 (2011.01)
H04N 21/24 (2011.01)
H04N 21/258 (2011.01)

(52) U.S. Cl.
CPC ... *H04N 21/23418* (2013.01); *H04N 21/2401* (2013.01); *H04N 21/25833* (2013.01)

(58) Field of Classification Search
CPC ......... H04N 21/23418; H04N 21/2401; H04N 21/25833; H04N 21/234345; H04N 21/234381; H04N 21/2187; H04N 7/18; H04N 7/186; H04N 5/77; H04N 5/144
See application file for complete search history.

(56) References Cited

U.S. PATENT DOCUMENTS

| | | | | |
|---|---|---|---|---|
| 2015/0163538 A1* | 6/2015 | Kellerman | ......... | H04N 21/4384 |
| | | | | 348/731 |
| 2017/0347068 A1* | 11/2017 | Kusumoto | ....... | G08B 13/19615 |
| 2022/0233272 A1* | 7/2022 | Landfors | ............... | G16H 40/20 |
| 2022/0303457 A1* | 9/2022 | Bastide | ................ | H04N 5/2222 |
| 2022/0385873 A1* | 12/2022 | Feng | ..................... | H04N 23/88 |

* cited by examiner

*Primary Examiner* — Gigi L Dubasky
(74) *Attorney, Agent, or Firm* — Joseph P. Aiena

(57) ABSTRACT

There is provided a system for altering video which includes at least one camera sending video feed to a hardware module or a software module. The module maintains a predefined amount of pre-roll past video frames to a triggering motion event. The pre-roll past video frames are sent upon connection by a user to a real time video feed display in a fast forward manner and the video stream is switched to real time video after receipt of the pre-roll past video frames.

11 Claims, 9 Drawing Sheets

Hardware 70

1 Software   88

WHY MOTION  (96)

WHY MOTION Internet  (200)

| | | | |
|---|---|---|---|
| 1# | Computer Vision Motion Detection  202 | Image Buffers  204 | Connection Manager  206 |
| 2# | PIR Passive Infrared 208 Laser Based Radio Based Motion Detection Internal/External Trigger | Logic  210 | User Manager  212 |

#1 CV (Computer Vision) Motion Detection  (202)

Let n = 1,2....N and Let Image (n) = Mat (n, m) [  ]
While dif = ABS (Image (n) – Image (n-1))

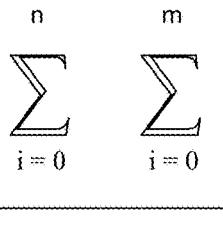

dif (n, m) = motion level n x m

If motion level is greater than or equal to user defined threshold, then motion detected.

#2 External Motion Detectors  (214)

PIR Passive Infrared
Laser

Motion Detectors Senses
External Events 216

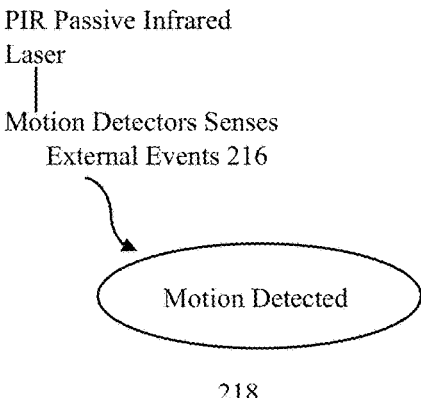

Figure 8:
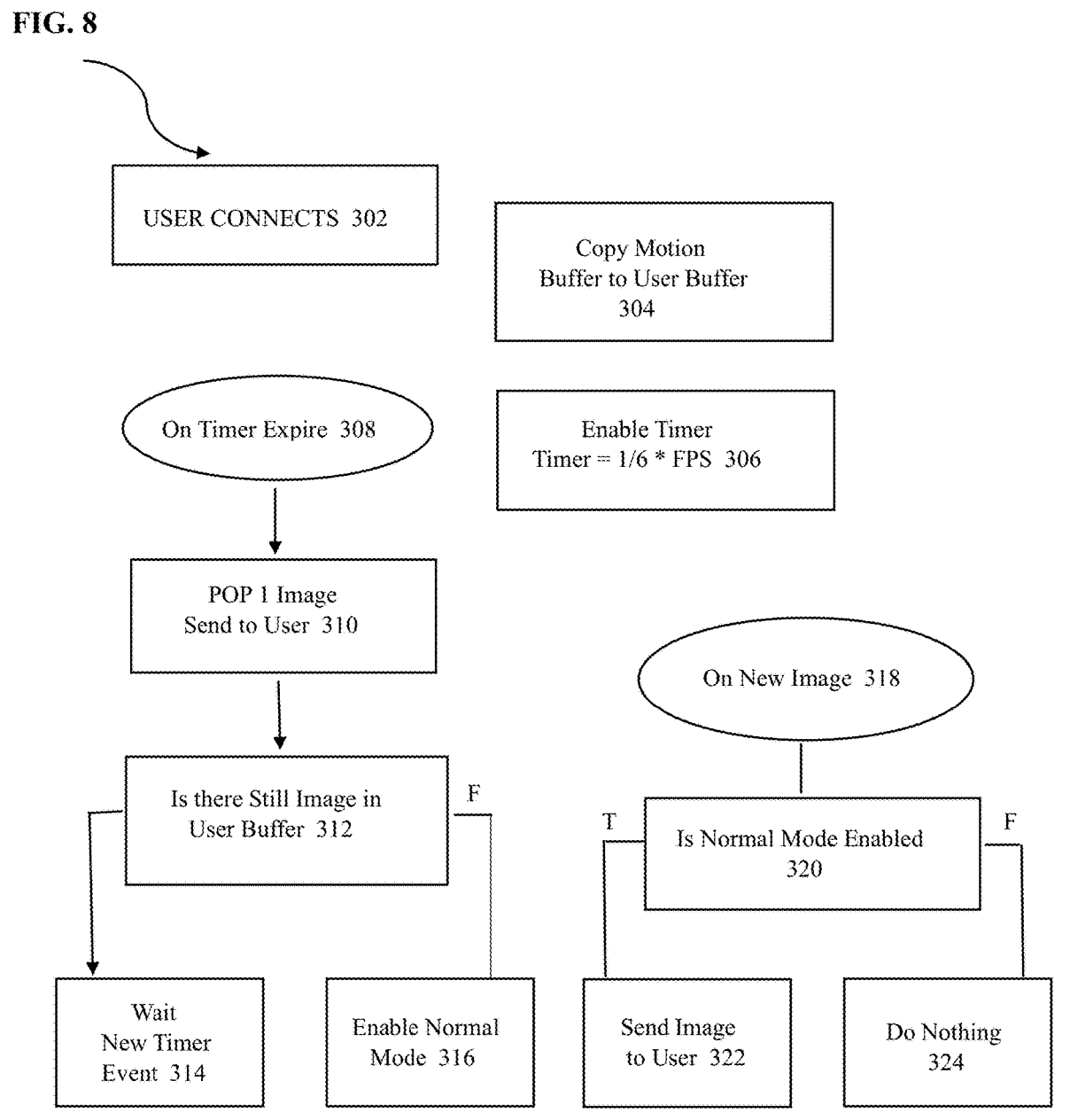

USER CONNECTS 302

Copy Motion
Buffer to User Buffer
304

On Timer Expire 308

Enable Timer
Timer = 1/6 * FPS 306

POP 1 Image
Send to User 310

On New Image 318

Is there Still Image in
User Buffer 312 | F

T | Is Normal Mode Enabled
320 | F

Wait
New Timer
Event 314

Enable Normal
Mode 316

Send Image
to User 322

Do Nothing
324

SYSTEM AND METHOD OF ALTERING REAL TIME AUDIO AND VIDEO STREAMS

CROSS REFERENCE TO RELATED APPLICATIONS

This application claims benefit of and priority to: U.S. patent application Ser. No. 18/081,642, filed on Dec. 14, 2022, as a continuation application, which claims benefit of and priority to U.S. Provisional Application Ser. No. 63/290, 804, filed on Dec. 17, 2021, each of which are incorporated by reference herein in their entirety.

FIELD OF THE INVENTION

The present invention relates to altering real-time audio/video stream content and/or speed and further relates to altering the content with external events, user definitions, user behavior analytics or machine intelligence.

BACKGROUND

Network enabled cameras (typically called IP cameras) are widely used in remote observation of residential or commercial fields for multiple purposes such as security related matters. In a usual scenario, a person can reach those cameras' real-time audio/video stream over a media (computer network) to observe/watch at will. Some of those cameras are equipped with a Passive Infrared (PIR)/Radar like motion detection circuit or perform motion detection by comparing video frame sequences pixel by pixel or have a button where a person can press (like such doorbell cameras) and generate a motion detection event.

On such events, the camera sends a notification to the user's network enabled device (such as a smartphone, tablet, computer) and typically when the user responds to this notification, he/she immediately connects and watches the camera's real-time audio/video stream. Due to the time difference between the event, notification delivery over the network and user response time, when the user starts the audio/video stream, the cause of the motion most of the time already ends and the user can not have information why the motion happened.

Another feature offered in most of those cameras is video clip recording, which starts video recording with the motion and/or some predefined time before the motion and continues for some period of time. Using the recorded clip, the user may have information about the motion. But the recorded clip stays in a camera's writable media (like the sd cards) where the user cannot reach immediately or while the video files are big in size, uploading to cloud and making it available to the user takes a significant amount of time that the user cannot know the reason for the motion immediately.

Most of the time a user has more than one camera installed in the field and the usual user behavior is to react to event notifications by watching other cameras as well by cycling over them. Switching from one camera to another means stopping a real time stream from one source and opening on another so it is generally slow, can take a time of up to 15 seconds. As an example, if the user wants to see four cameras, it will take almost a minute and it's already after the motion itself.

As noted, by the time a user connects to the real stream of the event, the cause of the motion has already disappeared. An example would be someone who takes packages from the door of a building or residence—the user receives notification but due to real time nature of video stream when connecting, the event is missed when it is happening. Some cameras can record this video to its internal storage (but the bad actor can see and vandalize the camera) or to cloud, which takes time to make and upload so user can see that happened only minutes later.

There is a need to provide a system and method of altering real time audio/video which incorporates information on the external triggering events.

SUMMARY OF THE INVENTION

The present invention involves the altering of real-time audio/video stream content and/or speed with external events, user definitions, user behavior analytics or machine intelligence. The term for this process herein may be identified or referenced as "Why Motion."

The present invention provides enough and accurate information to a user when the motion/event happens in front of the camera. In a typical application when a user reacts on an event, the cause of the motion has already disappeared, so a user cannot know why the alert was received. The present invention is used within camera, doorbell, and closed circuit television related applications.

The present invention includes a method for motion detection on video comprising the steps of connecting a user to the video feed and copying a motion buffer to a user buffer.

Then, enabling a timer, where the timer is ⅙ multiplied by the frames per second. The method of the invention populates an image and sending to the user upon the timer expiration. The method determines if there is an image in the user buffer and waits for a new timer event upon determining there is an image in the user buffer. The method then returns to enablement of normal mode upon determining there is no image in the user buffer.

The present invention includes a method for motion detection on video comprising the steps of connecting a user to the video feed, copying a motion buffer to a user buffer and enabling a timer, where the timer is ⅙ multiplied by the frames per second. The method continues by determining a presence of a new image, then determining if normal mode is enabled and sending images to the user if normal mode is enabled and taking no action if normal mode is not enabled.

The present invention includes a system for altering video comprising at least one camera sending video feed to a hardware module and the hardware module maintaining a predefined amount of pre-roll past (i.e. prior) video frames. The pre-roll past video frames sent upon connection by a user to a real time video feed display in a fast forward manner and switching to the real time video after receipt of the pre-roll past video frames. The system of the present invention includes the predefined amount of pre-roll past video frames is of a set duration prior to the present time.

In an embodiment, the system of the present invention further includes a notification sent to the user based on a triggering motion event and the real time video initiating upon response to the notification. The system of the present invention includes an embodiment where the hardware module includes a software module having a process to receive a video stream and send a video stream.

In an embodiment, the system of the present invention includes where the hardware module maintains past video rolls of at least two cameras in a field of view and the hardware module merges frames from the at least two cameras in temporal domain and sending the merged frames to the user in a fast forward manner.

In an embodiment, the system of the present invention includes where the hardware module maintains past video rolls of at least two cameras or several cameras in a field of view and the hardware module merges frames from the at least two cameras in temporal domain and sending the merged frames to the user in a fast forward manner.

In an embodiment, the system of the present invention further includes an input module which collects information that has user preferences, instructions on how to merge frames, identifying the frames of the at least two cameras to merge, and scene definition of the video. The system of the present invention further includes an overlaying of text information or text-to-speech audio information in the merged frames.

In an embodiment, the system of the present invention includes the hardware or software module combining user behavior analytics and sensory information to feed a machine learning model. The system of the present invention includes where the hardware or software module combines user behavior analytics and sensory information to feed a machine learning model and generate the merged frames automatically.

BRIEF DESCRIPTION OF THE DRAWINGS

FIG. 7 is a schematic diagram of the present invention.

FIG. 8 is a schematic diagram of the present invention.

DETAILED DESCRIPTION

The present invention and embodiments are described herein with reference to the accompanying figures.

In an embodiment, a software or hardware module which keeps the predefined amount of pre-roll past video frames. In case the user connects to the real-time feed, the system sends those past video rolls in fast forward first and switches to real-time video afterward, so the user immediately knows the motion reason and the duration until the present, real time.

Figure 1:
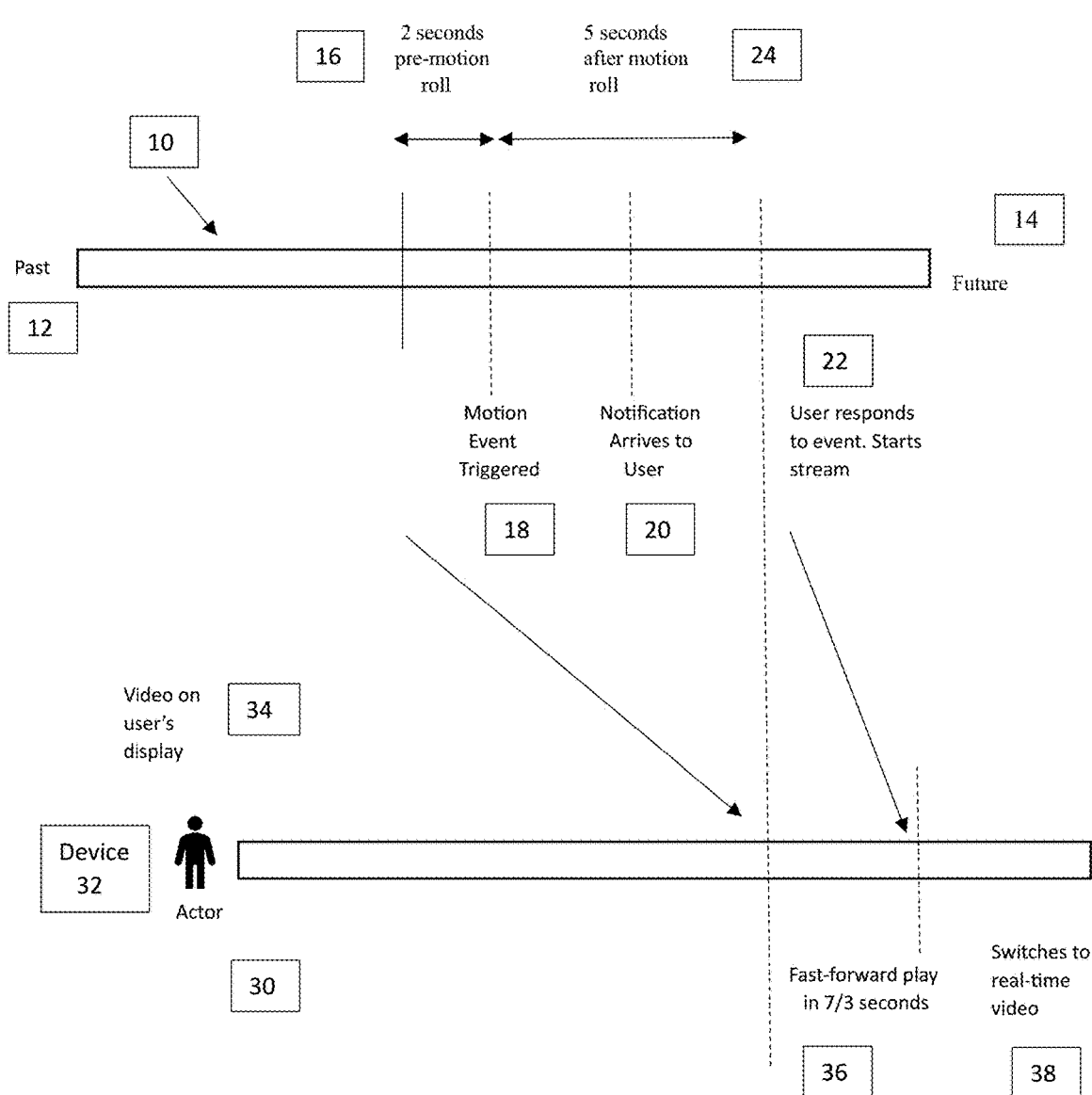
FIG. 1 is a schematic diagram of the present invention.

In the following non-limiting example shown in FIG. 1, there is a video timeline feed 10 going from the past events 12 on the left side to the future events 14 on the right side. As indicated in the diagram, the motion event is triggered 18, the notification 20 arrives to a user, and the user responds 22 to the event to start the stream. With the present invention, however, the user is provided automatically with the video feed of the events when the user responds to the actual event to start the stream. The pre-motion video roll of the triggering event is provided to the user 30 on their display device 32 as a starting point, instead of the current live video. In the example of FIG. 1, the pre-motion roll 16 to the trigger event 18 is set as two seconds and the post-motion roll is taken as seven seconds. As shown on the lower timeline of FIG. 1, the video shown to the actor 30 on the user's display 34 on the device 32 will start with the pre-motion roll 16 and fast forward play 36 at increased speed. In the example shown, the increased speed is seven seconds being shown in one third of the actual time. (Fast Forward speed taken as 3X). After which, the video stream 34 shown to the user switches to real time 38.

Figure 2:
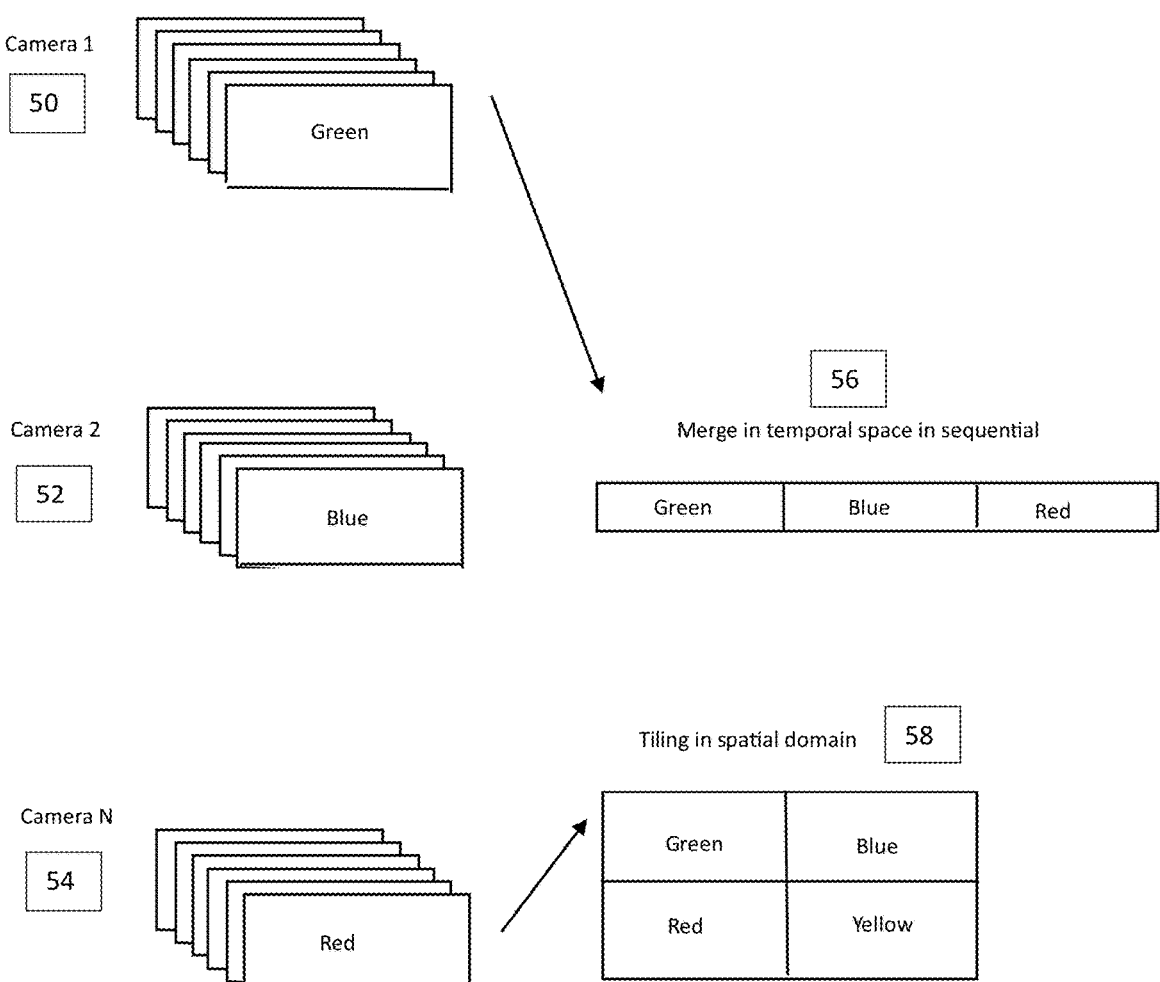
FIG. 2 is a schematic diagram of an embodiment of the present invention.

In an embodiment, referring to FIG. 2, a software or hardware module keeps track of past video rolls of multiple cameras (camera 1 (50), camera 2 (52), camera N (54)) in the field and merges those frames from different cameras in temporal domain 56 or spatial domain 58 and sends them to user in fast forward manner.

In an embodiment, an input module that collects user preferences, how to merge, which cameras to merge and which additional information to add to the video (which is called scene definition).

Examples

A user may have 10 cameras but not every camera is equally important for different events so the user may select which cameras to merge (as in embodiment described above), how to merge or which additional information to add.

Figure 3:
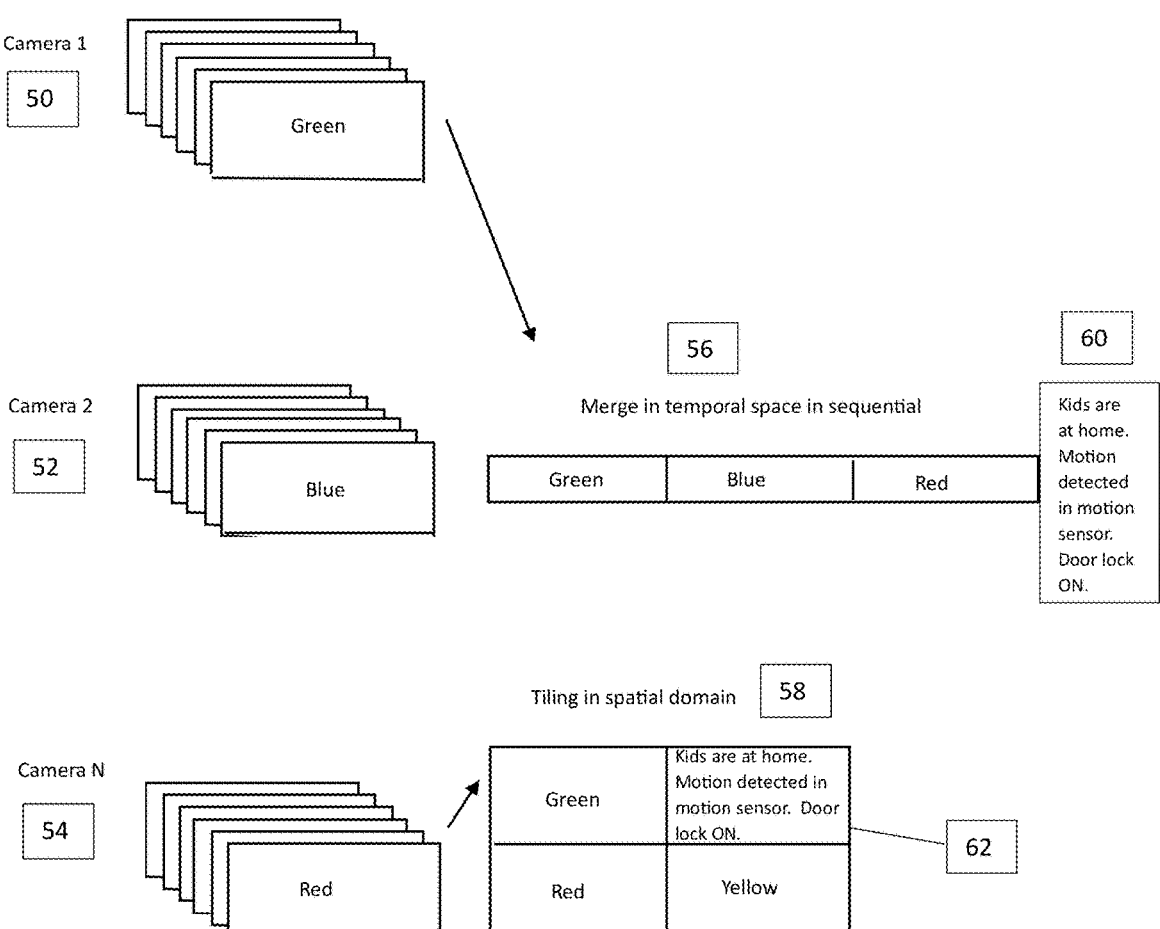
FIG. 3 is a schematic diagram of an embodiment of the present invention.

In another embodiment, there is an overlaying of additional text information, or text-to-speech audio information in the merged video. As not every notification is equally important, such as a doorbell ring is not as important when children are home or not home. In this embodiment, users may define in the scenes which additional sensory information should be added. The home status of the children or other family members can be taken from geo-fencing and or smart bracelets and/or smart watches, other sensory information not limited to this can be overlayed on the video. This is illustrated with respect to FIG. 3. As before, a software or hardware module keeps track of past video rolls of multiple cameras (camera 1 (50), camera 2 (52), camera N (54)) in the field and merges those frames from different cameras in temporal domain or spatial domain and sends them to a user in fast forward manner. This can be seen in FIG. 3 with the motion detected in motion sensor and door lock "on" (block 60), in the merge in temporal space format 56 and with the motion detected in motion sensor and door lock "On" (block 62).

In another embodiment, a software or hardware module which combines user behavior analytics and other sensory information feeds a machine learning model and generates the merged video automatically. Information includes duration, extra information input, which cameras to use etc.

An advantage of the system is that when a user connects to a real time stream, the user starts seeing before the trigger motion itself and until the connection time, with a three (3) times fast forwarded manner that later switches to real time so the user knows exactly what happened, and also what happened until the present with that particular camera. The user is not limited to combining with other cameras, and the user does not need to switch to viewing other cameras in their home which causes the user to lose time and lose portions of the real time feed. As a non-limiting example, if the user has four cameras at home, and received a motion alert and the user's window is broken by someone at the moment the user sees this, the user would cycle through all other cameras that anyone still home (wife/children). As the user does not know where they are, in order to look at all the cameras will take time. While the user is watching one camera, the user cannot watch the other cameras and will lose the context. With this system of the present invention, a synchronized multi or single view started by the event fast forwards until the present and continues in real time afterwards.

Figure 4:
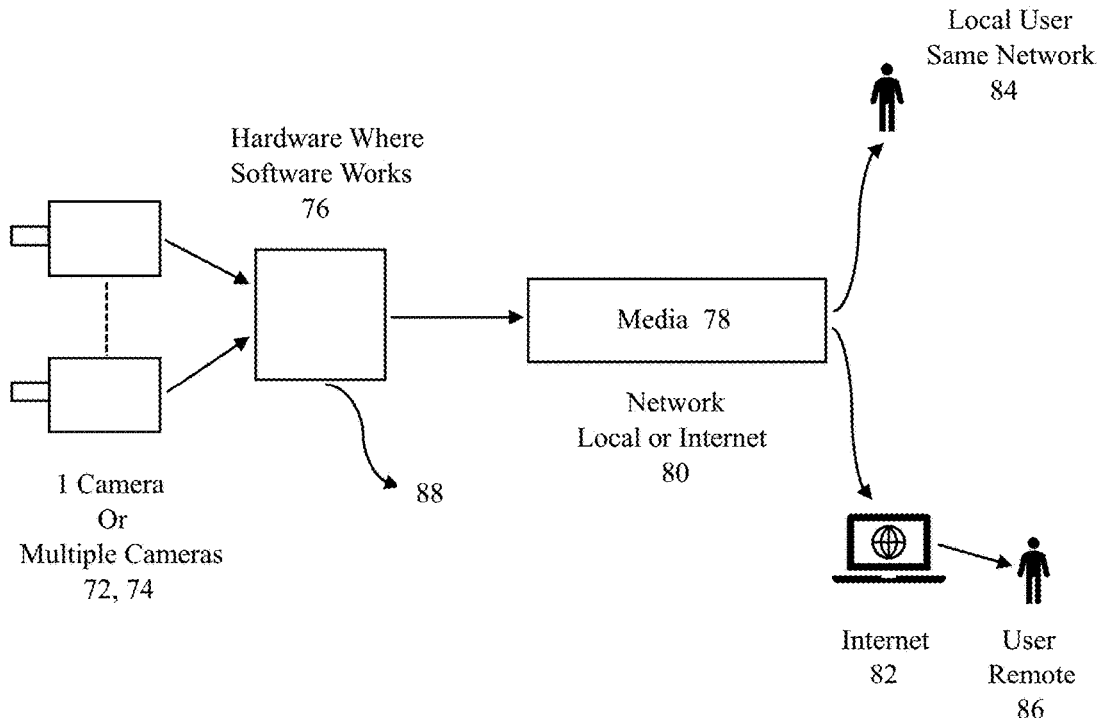
FIG. 4 is a schematic diagram of the present invention.

Referring to FIG. 4, there is shown the hardware portion 70 of the system of the present invention. One or more cameras 72, 74 are set up within the system, sending their respective video feed to the hardware 76 of the system. The hardware 76 is where the software functions/works, which is described further with reference to FIG. 5 below. From the hardware 76, the feed is sent through media 78 by networks 80, such as internet 82 or local. With the internet, a remote user 86 can view the feed or a local user 84 on the same network can view the feed.

Figure 5:
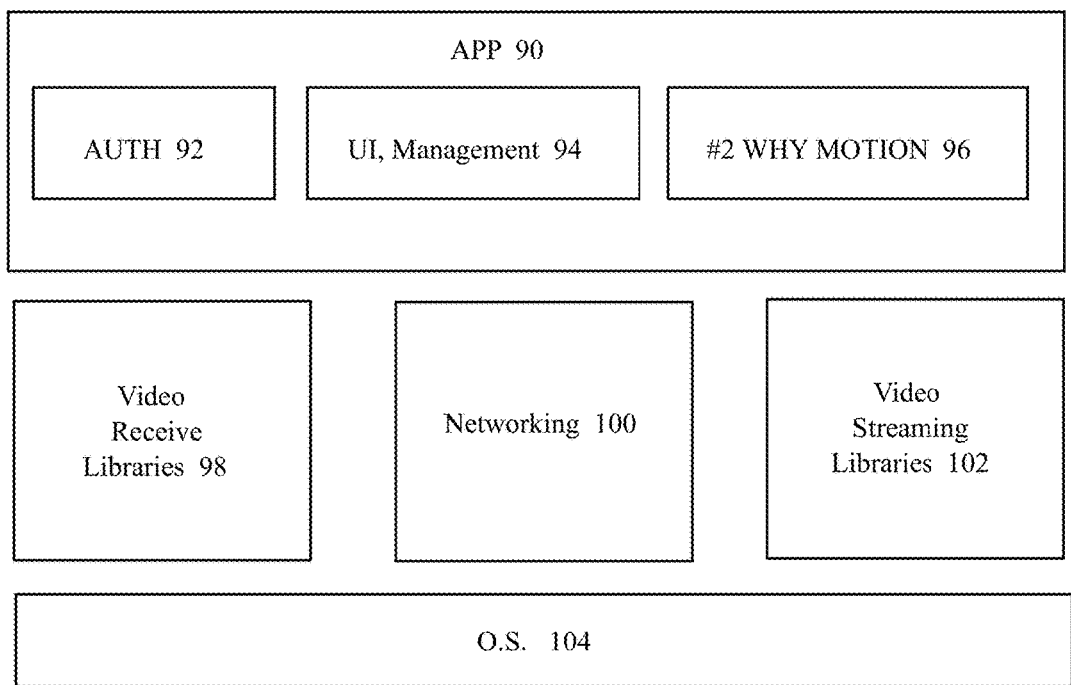
FIG. 5 is a schematic diagram of the present invention.

The software portion 88 of the present invention as shown in FIG. 5 includes the operating system layer 104, above which is the video receiving libraries 98, networking functions 100, and the video sending libraries 102. Above that layer is placed the application layer 90. This will include the authorizations 92, the user interface and merge motions 94, and the why motion features 96 of the present invention.

Figure 6:
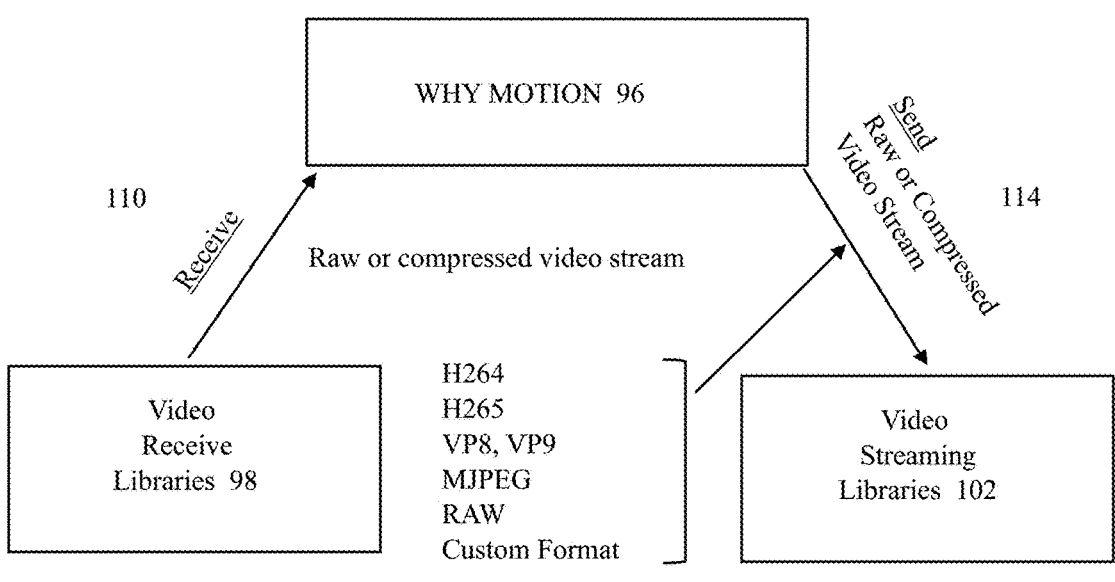
FIG. 6 is a schematic diagram of the present invention.

Referring to FIG. 6, there is shown the WhyMotion feature 96 of the present invention. The present invention receives raw or compressed video stream 110, from video or libraries 98. The present invention WhyMotion 96 sends compressed or raw video streams out 114, including video, streaming, and libraries 102. The format 112 can include H264, H265, VP8, VP9, MJPEG, raw or custom format.

The "WhyMotion" internal description 200 of the present invention is illustrated in FIG. 7. There is shown the computer vision motion detection 202, the image buffer 204 and the connection manager 206.

$$\text{Let } n = 1, 2, \ldots N$$

$$\text{and}$$

$$\text{Let Image } (n) = Mat\,(n, m)$$

$$\text{While}$$

$$dif = \text{ABS (Image } (n) - \text{Image } (n-1))$$

$$\sum_{i=0}^{n} \sum_{i=0}^{m} dif\,(n, m) = \text{motion level}$$

$$\frac{i = 0 \; i = 0}{n \times m}$$

If motion level is greater than or equal to user defined threshold, then motion detected.

In FIG. 7, second row, there is shown the PIR passive internal 208, (laser based, radio based, motion detection, internal/external trigger); logic 210; and the user manager 212. With this second row, the external motion detectors 214 have the PIR passive internal, laser. This allows the motion detectors 214 to sense the external event(s) 216 with the motion detected 218.

As illustrated in FIG. 8, the user connects 302 to the system of the present invention. Initially, the system copies the motion buffer to the user buffer 304. The system enables the timer where the timer is ⅙ times the frames per second (fps) 306. Upon the timer expiration 308, populate the system database with one image and send to the user 310. The system of the invention then determines if there is still an image in the user buffer 312. If so, the system waits on a new timer event upon determining there is still an image or images to be sent to the user buffer 314. The system of the present invention returns to the enablement of normal mode upon determining there is no image in the user buffer 316.

Alternatively to the steps just described, where the system copies the motion buffer to the user buffer and the system enables the timer where the timer is ⅙ times the frames per second (fps), the system determines the presence of a new image 318. Then, the system determines if normal mode is enabled 320. The system then sends images 322 to the user if normal mode is enabled and the system takes no action 324 if normal mode is not enabled.

Figure 9:
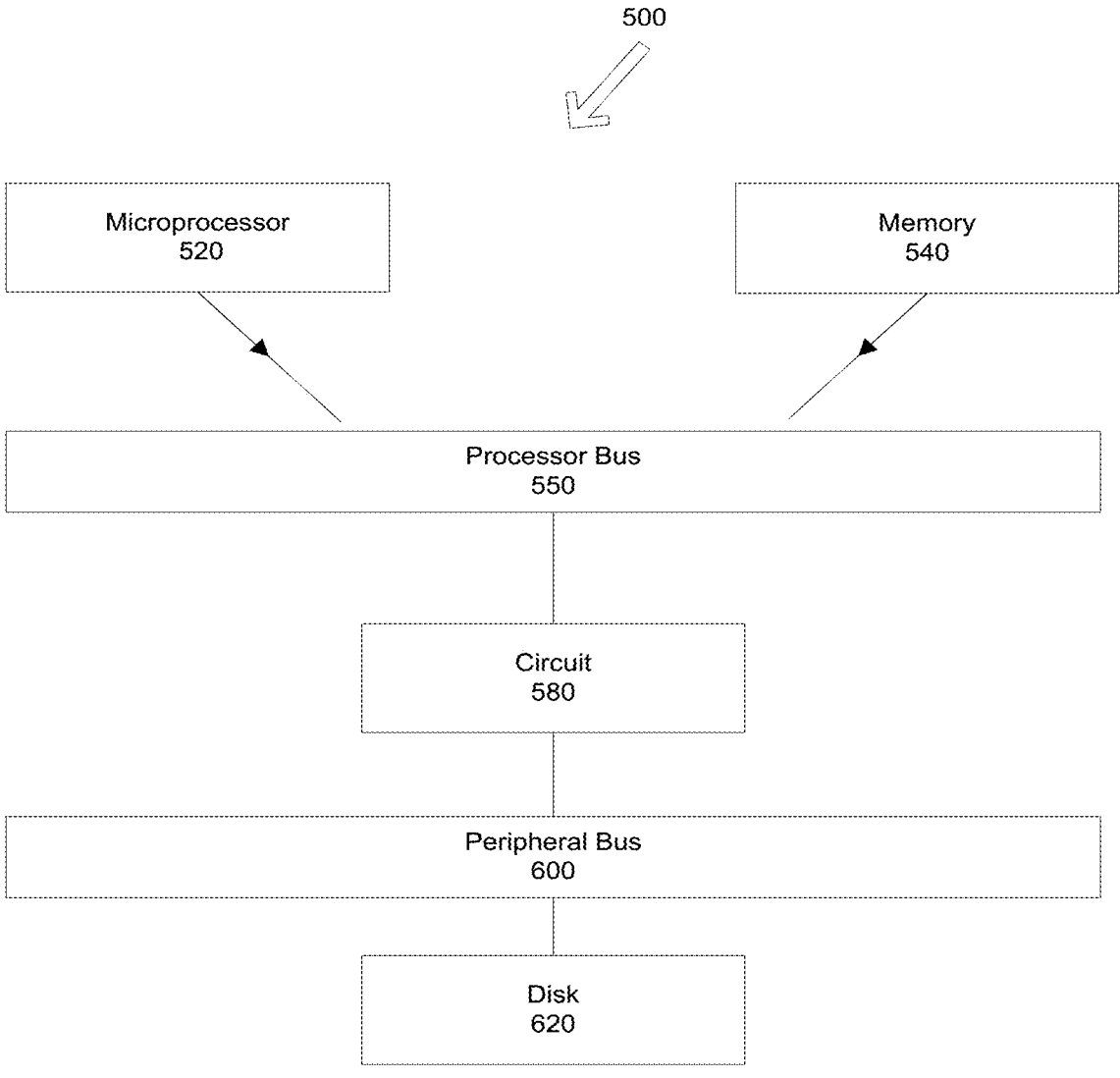
FIG. 9 is a schematic diagram of the computer device components of the present invention.

FIG. 9 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or or data to a programmable processor, including a machine-readable medium that receives machine instructions as a machine-readable signal. The "computer readable storage medium" may be any tangible medium (but not a signal medium—which is defined below) that can contain or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

The computing device may be implemented in a number of different forms, including laptops or personal computers. For example, it may be implemented as a cellular telephone. It may also be implemented as part of a smartphone, personal digital assistant, tablet, or other similar mobile device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A system for altering video comprising:

at least one camera sending video feed to a hardware module;

said hardware module maintaining a predefined amount of pre-roll past video frames, said hardware module combining user behavior analytics and sensory information to feed a machine learning model;

said pre-roll past video frames sent upon connection by a user to a real time video feed display in a fast forward manner and switching to said real time video after receipt of said pre-roll past video frames; and overlaying of text information and text-to-speech audio information in merged frames of said pre-roll past video frames.

2. The system of claim 1 further comprising said predefined amount of pre-roll past video frames is of a set duration prior to present time.

3. The system of claim 1 further comprising a notification sent to said user based on a motion event and said real time video initiating upon response to said notification.

4. The system of claim 1 wherein said hardware module includes a software module having a process to receive a video stream and send a video stream.

5. The system of claim 4 wherein said software module comprises an operating system layer, video receiving libraries, networking functions, and video sending libraries.

6. The system of claim 5 wherein said software module further comprises an application layer which includes authorizations, user interface, and motion features.

7. The system of claim 6 wherein said motion features include computer vision motion detection, image buffer, and a connection manager.

8. The system of claim 1 further comprising an input module which collects information which has user preferences.

9. The system of claim 1 further comprising an input module which collects instructions on how to merge frames.

10. The system of claim 1 further comprising an input module which identifies frames of at least two cameras to merge.

11. The system of claim 1 further comprising an input module which identifies scene definition of video.

* * * * *